US012808971B2

(12) United States Patent
Kumar et al.

(10) Patent No.: US 12,808,971 B2
(45) Date of Patent: Nov. 24, 2026

(54) OPPORTUNISTIC ACTION SELECTION FOR IMPROVED POSITIONING

(71) Applicant: QUALCOMM Incorporated, San Diego, CA (US)

(72) Inventors: Mukesh Kumar, Bangalore (IN); Chandrasekhar Jayaram, Bangalore (IN); Srinivas Gangji, Bangalore (IN); Santoshkumar Zalake, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 18/430,458

(22) Filed: Feb. 1, 2024

(65) Prior Publication Data

US 2025/0251482 A1 Aug. 7, 2025

(51) Int. Cl.
*G01S 5/00* (2006.01)

(52) U.S. Cl.
CPC .................................... *G01S 5/01* (2020.05)

(58) Field of Classification Search
CPC ........................................................ G01S 5/01
See application file for complete search history.

(56) References Cited

U.S. PATENT DOCUMENTS

2018/0105182 A1* 4/2018 Kim ........................ G01S 19/42
2018/0203130 A1* 7/2018 Neubecker .............. G01S 19/46
2023/0152469 A1* 5/2023 Liu ........................ G01S 5/0009 455/456.1
2025/0151012 A1* 5/2025 Rao ........................ G01S 5/0268
2025/0287348 A1* 9/2025 Hwang ..................... G01S 5/01

FOREIGN PATENT DOCUMENTS

FR 3157320 A1 * 6/2025 ........... G06V 20/582

OTHER PUBLICATIONS

English Translation of FR 3157320 A1 (Year: 2023).*

* cited by examiner

*Primary Examiner* — Bernarr E Gregory
*Assistant Examiner* — Isabella A Edrada
(74) *Attorney, Agent, or Firm* — Procopio, Cory, Hargreaves & Savitch LLP

(57) ABSTRACT

A user equipment (UE) at a vehicle may receive a set of positioning signals from a set of positioning signal transmission devices (e.g., global positioning satellites (GPSs)). The UE may calculate a set of positioning attributes of the UE using a positioning device (e.g., a global navigation satellite system (GNSS) device) based on the received set of positioning signals. The UE may calculate an initial state of the positioning device based on the calculated set of positioning attributes and a set of environmental inputs associated with the UE. The UE may calculate an expected reward value for each of a set of potential positioning actions for the positioning device based on the calculated initial state. The UE may perform a positioning action of the set of potential positioning actions on the positioning device based on the calculated expected reward value for each of the set of potential positioning actions.

20 Claims, 12 Drawing Sheets

OPPORTUNISTIC ACTION SELECTION FOR IMPROVED POSITIONING

TECHNICAL FIELD

The present disclosure relates generally to communication systems, and more particularly, to a wireless positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The apparatus may be associated with a vehicle, for example the apparatus may be functionally coupled to a communication port of the vehicle, or may be wirelessly paired with a transceiver of the vehicle. The apparatus may receive a set of positioning signals from a set of positioning signal transmission devices. The set of positioning signal transmission devices may include a set of global positioning satellites (GPSs). The apparatus may calculate a set of positioning attributes of the apparatus using a positioning device. The positioning device may include a global navigation satellite system (GNSS) device. The apparatus may calculate an initial state of the positioning device based on the calculated set of positioning attributes and a set of environmental inputs associated with the apparatus. The apparatus may calculate an expected reward value for each of a set of potential positioning actions for the positioning device based on the calculated initial state. The apparatus may perform a positioning action (e.g., perform a soft reset, perform a robust reset, switch to a low-power mode) of the set of potential positioning actions on the positioning device based on the calculated expected reward value for each of the set of potential positioning actions.

In some aspects, the techniques described herein relate to a method of improving wireless positioning recovery at a user equipment (UE), including: receiving a set of positioning signals from a set of positioning signal transmission devices; calculating a set of positioning attributes of the UE using a positioning device based on the received set of positioning signals; calculating an initial state of the positioning device based on the calculated set of positioning attributes and a set of environmental inputs associated with the UE; calculating an expected reward value for each of a set of potential positioning actions for the positioning device based on the calculated initial state; and performing a positioning action of the set of potential positioning actions on the positioning device based on the calculated expected reward value for each of the set of potential positioning actions.

In some aspects, the techniques described herein relate to a method, further including: receiving a second set of positioning signals from a second set of positioning signal transmission devices; calculating a second set of positioning attributes of the UE using the positioning device based on the second set of positioning signals after the performance of the positioning action; calculating a resultant state of the positioning device based on the calculated second set of positioning attributes and a second set of environmental inputs associated with the UE; and revising the expected reward value for the positioning action of the set of potential positioning actions for the positioning device based on the calculated resultant state of the UE.

In some aspects, the techniques described herein relate to a method, wherein the set of environmental inputs include at least one of: live traffic information associated with an estimated location of the UE; path history of an on-board unit (OBU) device; map information associated with the estimated location of the UE; a central processing unit (CPU) usage metric associated with the UE; a wireless traffic metric usage metric associated with the UE; a sensor calibration state metric associated with the UE; a set of sensor data associated with the UE; or a power metric associated with the UE.

In some aspects, the techniques described herein relate to a method, further including: receiving a wireless signal including an indicator of at least one of the live traffic information, the path history, or the map information.

In some aspects, the techniques described herein relate to a method, wherein the wireless signal includes at least one of a sidelink signal or a vehicle to everything (V2X) signal.

In some aspects, the techniques described herein relate to a method, wherein receiving the wireless signal includes: receiving the wireless signal from at least one of a second UE, an on-board unit (OBU) of a vehicle or a road side unit (RSU).

In some aspects, the techniques described herein relate to a method, further including: collecting the set of sensor data from a set of sensors at the UE.

In some aspects, the techniques described herein relate to a method, wherein the set of sensors include at least one of: an accelerometer; a camera; an inertial measurement unit (IMU); or an odometer.

In some aspects, the techniques described herein relate to a method, wherein the set of potential positioning actions include at least one of: refraining from performing the positioning action until an event is detected by the UE; switching to a low-power mode of the UE; resetting the positioning device; selecting a first subset of the set of positioning signal transmission devices for the calculation of the set of positioning attributes; or selecting a second subset of the set of positioning signal transmission devices for the calculation of the set of positioning attributes.

In some aspects, the techniques described herein relate to a method, wherein the positioning device includes a global navigation satellite system (GNSS) device.

In some aspects, the techniques described herein relate to a method, wherein the set of positioning signal transmission devices include a set of global positioning satellites (GPSs).

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
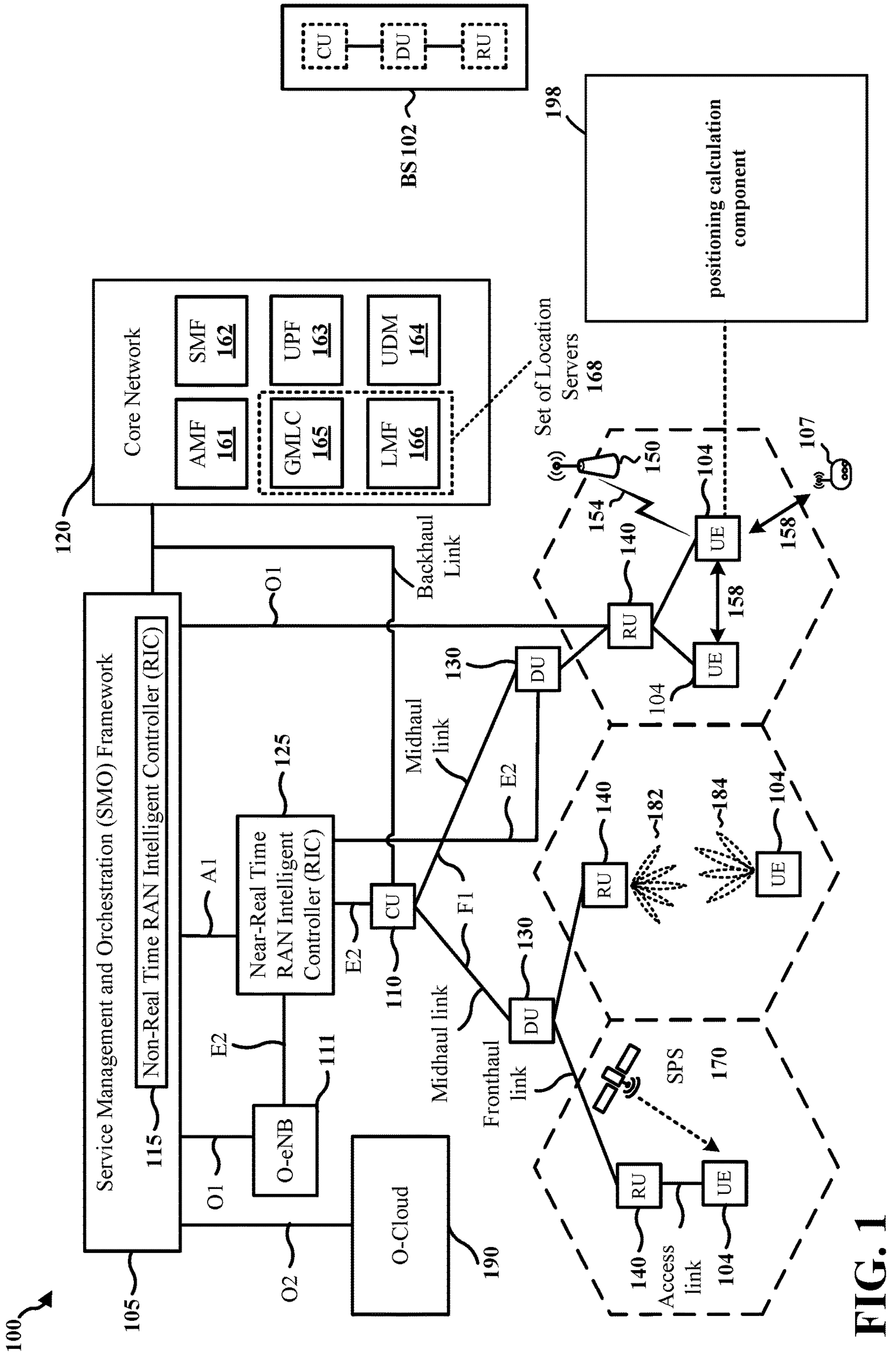
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to a wireless positioning system. Some aspects more specifically relate to improving selection of opportunistic actions for a positioning device of a wireless positioning system. In some examples, a user equipment (UE) (e.g., a mobile UE, a UE functionally coupled to a vehicle) may receive a set of positioning signals from a set of positioning signal transmission devices. The UE may calculate a set of positioning attributes of the UE using a positioning device based on the received set of positioning signals. The UE may calculate an initial state of the positioning device based on the calculated set of positioning attributes and a set of environmental inputs associated with the UE. The UE may calculate an expected reward value for each of a set of potential positioning actions for the positioning device based on the calculated initial state. The UE may perform a positioning action of the set of potential positioning actions on the positioning device based on the calculated expected reward value for each of the set of potential positioning actions.

In some aspects, a vehicle may have a positioning device, such as an automotive global navigation satellite system (GNSS) device or a GNSS engine. Such a positioning device may operate in one state for a period of time, which may result in accuracy/availability issues and high energy-per-fix. In some aspects, a UE may be configured to take opportunistic actions for error recovery and to fix accuracy improvements at the positioning device. A predictor model (e.g., a reinforcement learning (RL) agent, a contextual multi-arm bandit) may be configured to receive various input data, including an environmental state, to identify and perform an opportunistic action on the positioning device. The input data may be received via vehicle to everything (V2X) signals.

Particular aspects of the subject matter described in this disclosure can be implemented to realize one or more of the following potential advantages. In some examples, by configuring a UE at a vehicle to opportunistically take actions on a positioning device based on various input data, the described techniques can be used to improve the state of a positioning device. Such improvements may improve GNSS accuracy, quality, and/or availability. Such techniques may be used to improve, recover, and/or fallback the positioning device to move from a suboptimal state to an optimal state. UEs may share data via sidelink signals (e.g., V2X) to further improve the quality of such opportunistic actions.

Identifying and organizing which positioning actions a UE may perform based on its detected state may increase chances to for a positioning device recover from a sub-optimal state (e.g., a sub-optimal GNSS state). By predicting expected rewards for each potential action in a particular state, the UE may improve positioning fix accuracy by utilizing context-aware algorithms. The opportunistic actions may also optimize CPU usage or optimize utilization of power by positioning devices. Such a positioning device may have better GNSS calculated position, velocity, time (PVT) value availability, improving its ability to actively communicate with other UEs via sidelink signals (e.g., vehicle-to-everything (V2X) signals). Reinforcement learning (RL) techniques may be utilized to opportunistically identify malicious inconsistencies (e.g., malicious spoofing, a malicious agent) or perform opportunistic receiver autonomous integrity monitoring (RAIM) or lane-level navigation.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

A link between a UE 104 and a base station 102 may be established as an access link, for example, using a UE universal terrestrial radio access network (UTRAN)) interface. Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication via a D2D communication link 158 may also be transmitted and received by other transmitting and receiving devices, such as Road Side Unit (RSU) 107, etc. Sidelink communication may be exchanged using a PC5 interface, such as described in connection with the example in FIG. 4. Although the following description, including the example slot structure of FIG. 4, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a positioning calculation component 198 that may be configured to receive a set of positioning signals from a set of positioning signal transmission devices. The positioning calculation component 198 may be configured to calculate a set of positioning attributes of the UE 104 using a positioning device. The positioning calculation component 198 may be configured to calculate an initial state of the positioning device based on the calculated set of positioning attributes and a set of environmental inputs associated with the UE 104. The positioning calculation component 198 may be configured to calculate an expected reward value for each of a set of potential positioning actions for the positioning device based on the calculated initial state. The positioning calculation component 198 may be configured to perform a positioning action of the set of potential positioning actions on the positioning device based on the calculated expected reward value for each of the set of potential positioning actions.

Figure 2B:
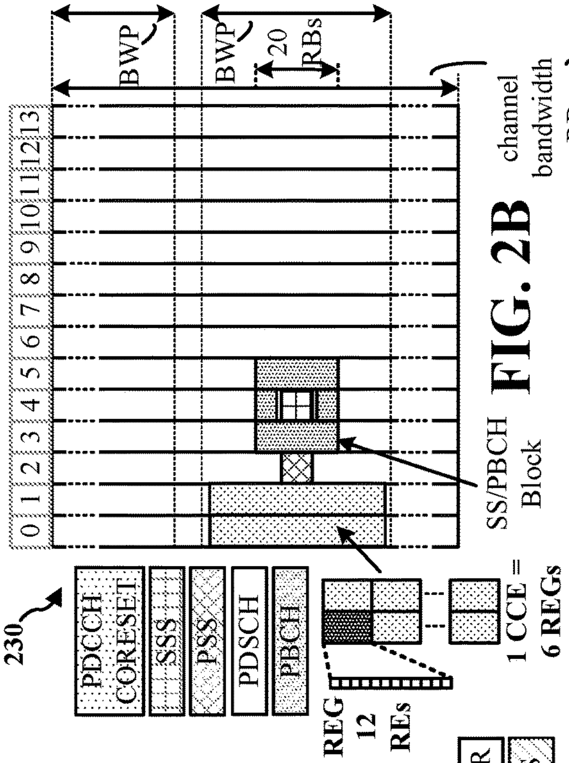
FIG. 2B is a diagram illustrating an example of downlink (DL) channels within a subframe, in accordance with various aspects of the present disclosure.
Figure 2D:
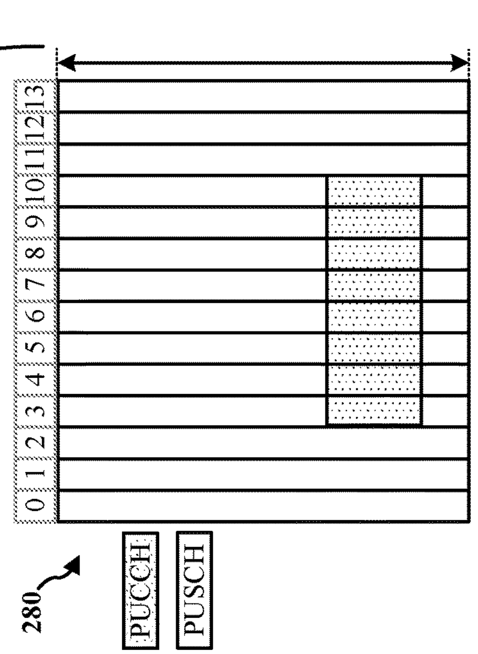
FIG. 2D is a diagram illustrating an example of uplink (UL) channels within a subframe, in accordance with various aspects of the present disclosure.
Figure 2A:
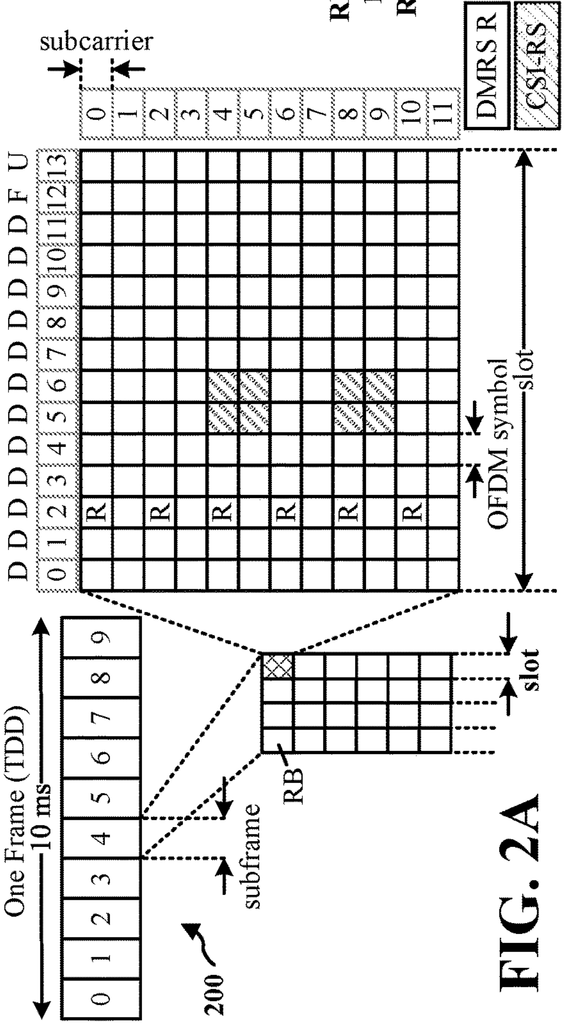
FIG. 2A is a diagram illustrating an example of a first frame, in accordance with various aspects of the present disclosure.
Figure 2C:
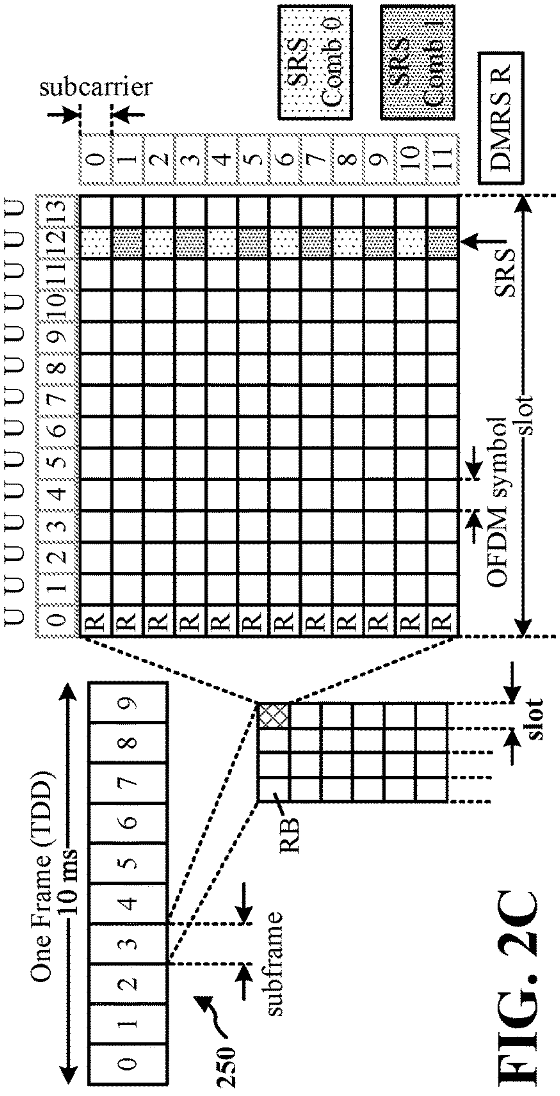
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
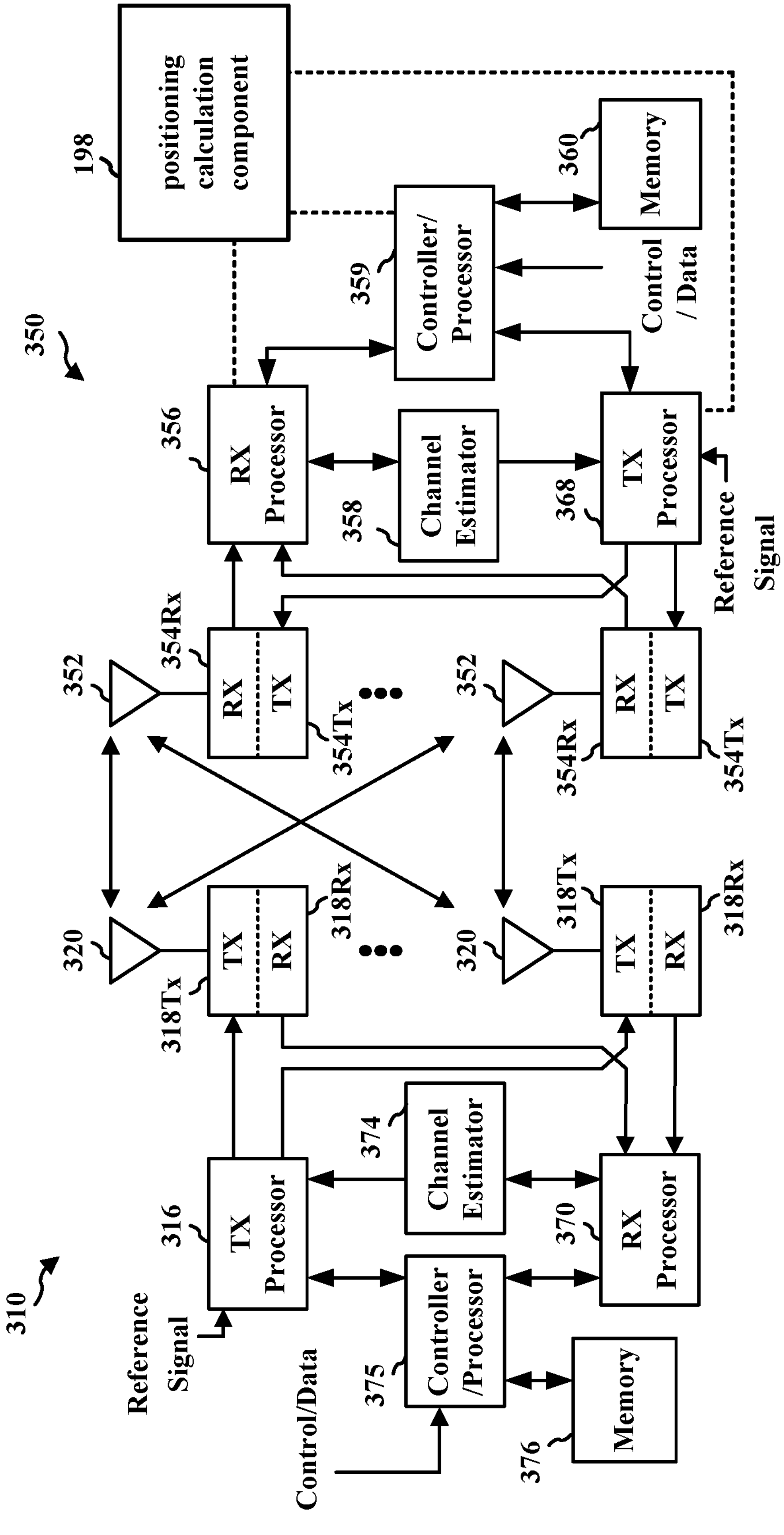
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning calculation component 198 of FIG. 1.

Figure 4:
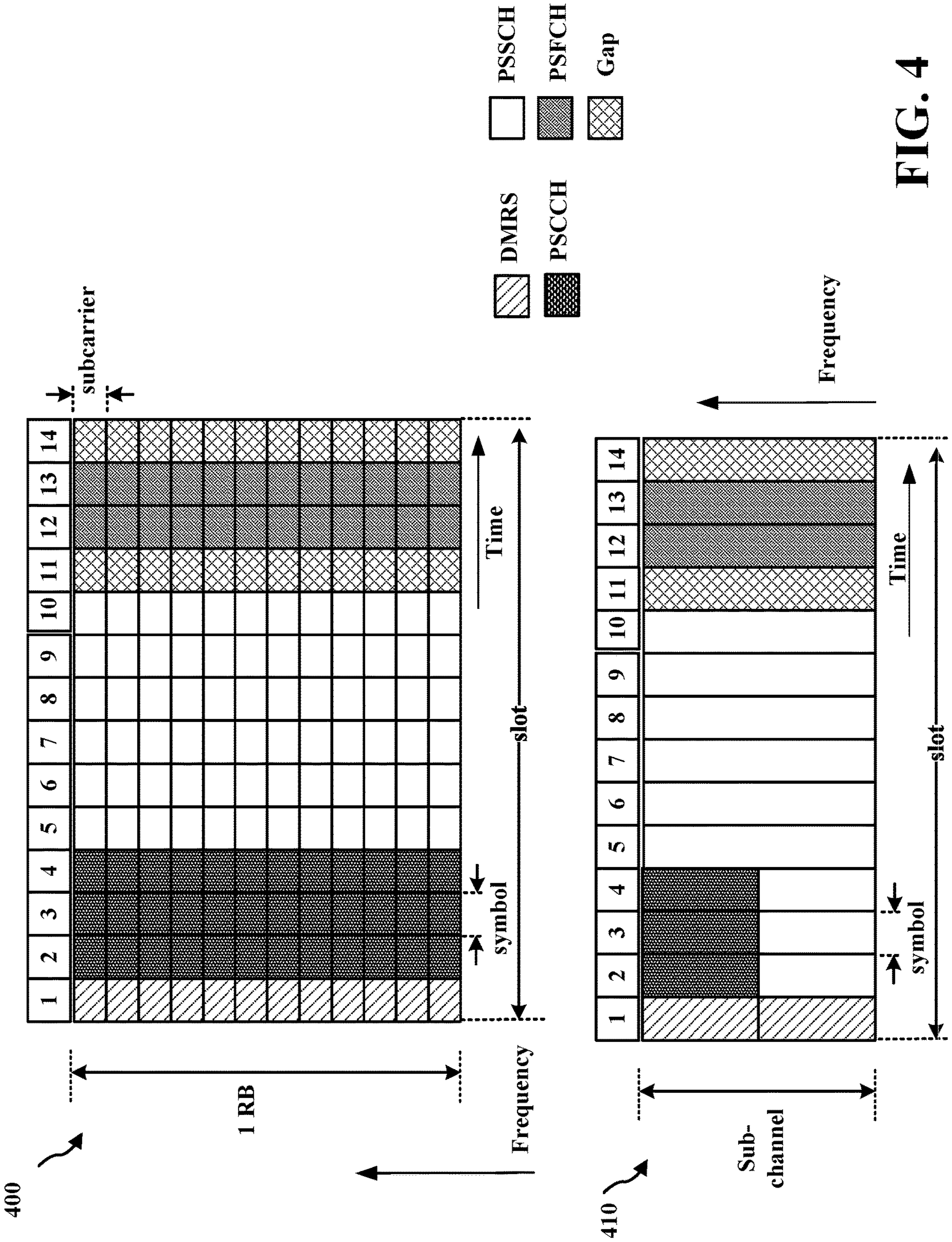
FIG. 4 illustrates example aspects of a sidelink slot structure.

FIG. 4 includes diagrams 400 and 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 4. Multiple slots may be aggregated together in some aspects.

Figure 5:
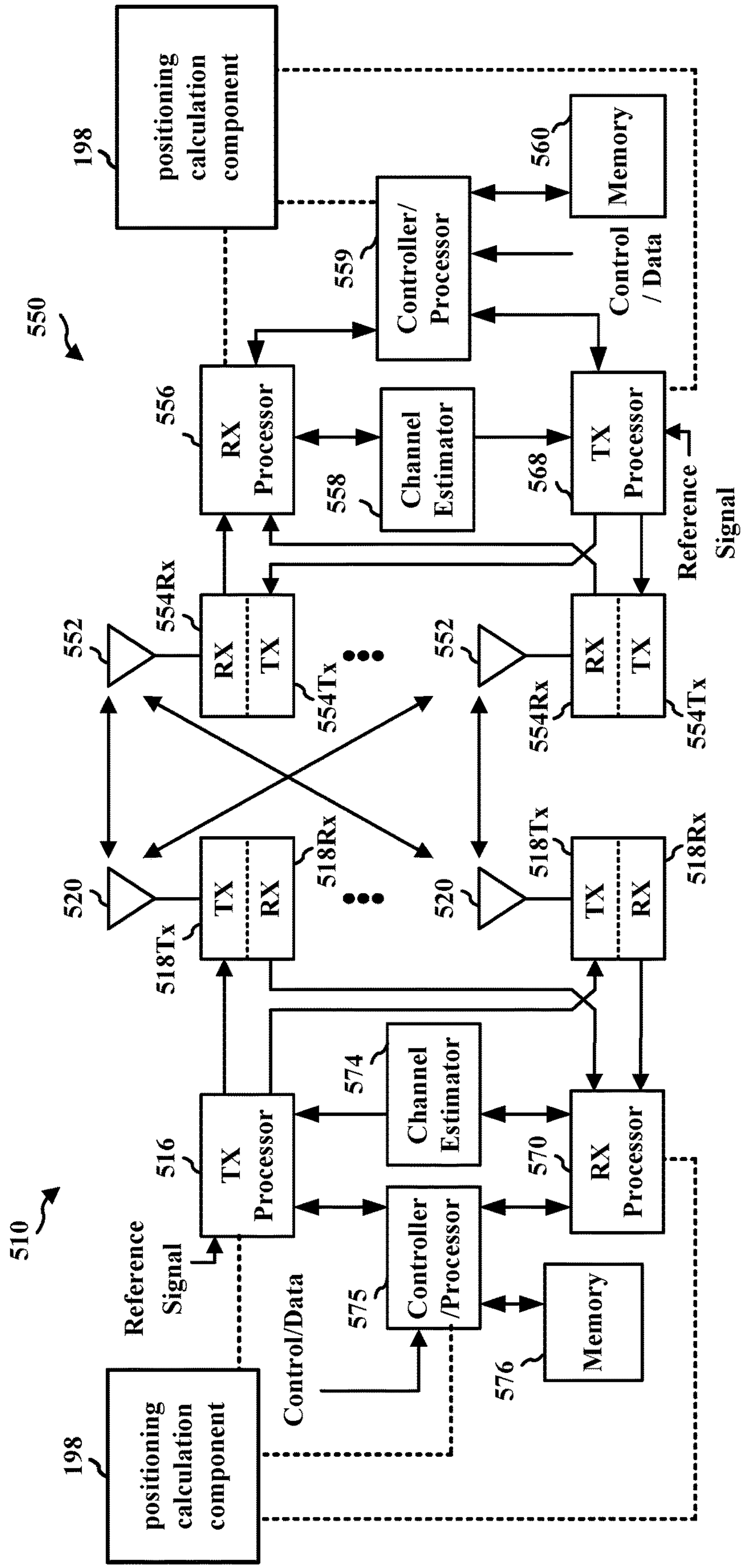
FIG. 5 is a diagram illustrating an example of a first device and a second device involved in wireless communication based, e.g., on sidelink.

FIG. 5 is a block diagram of a wireless communication device 510 in communication with a wireless communication device 550 based on sidelink. The wireless communication device 510 may be a UE, an RSU, or a base station. The wireless communication device 550 may be a UE, an RSU, or a base station. In some examples, the wireless communication device 510 and wireless communication device 550 may communicate based on V2X or other D2D communication. The communication may be based on sidelink using a PC5 interface. Packets may be provided to a controller/processor 575 that implements layer 3 and layer 2 functionality. Layer 3 includes an RRC layer, and layer 2 includes a PDCP layer, an RLC layer, and a MAC layer.

The TX processor 516 and the RX processor 570 implement layer 1 functionality associated with various signal processing functions. Layer 1, which includes a PHY layer, may include error detection on the transport channels, FEC coding/decoding of the transport channels, interleaving, rate matching, mapping onto physical channels, modulation/demodulation of physical channels, and MIMO antenna processing. The TX processor 516 handles mapping to signal constellations based on various modulation schemes (e.g., BPSK, QPSK, M-PSK, M-QAM). The coded and modulated symbols may then be split into parallel streams. Each stream may then be mapped to an OFDM subcarrier, multiplexed with a reference signal (e.g., pilot) in the time and/or frequency domain, and then combined together using an IFFT to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the wireless communication device 550. Each spatial stream may then be provided to a different antenna 520 via a separate transmitter 518Tx. Each transmitter 518Tx may modulate an RF carrier with a respective spatial stream for transmission.

At the wireless communication device 550, each receiver 554Rx receives a signal through its respective antenna 552. Each receiver 554Rx recovers information modulated onto an RF carrier and provides the information to the RX processor 556. The TX processor 568 and the RX processor 556 implement layer 1 functionality associated with various signal processing functions. The RX processor 556 may perform spatial processing on the information to recover any spatial streams destined for the wireless communication device 550. If multiple spatial streams are destined for the wireless communication device 550, they may be combined by the RX processor 556 into a single OFDM symbol stream. The RX processor 556 then converts the OFDM symbol stream from the time-domain to the frequency domain using a FFT. The frequency domain signal includes a separate OFDM symbol stream for each subcarrier of the OFDM signal. The symbols on each subcarrier, and the reference signal, are recovered and demodulated by determining the most likely signal constellation points transmitted by the wireless communication device 510. These soft decisions may be based on channel estimates computed by the channel estimator 558. The soft decisions are then decoded and deinterleaved to recover the data and control signals that were originally transmitted by the wireless communication device 510 on the physical channel. The data and control signals are then provided to the controller/processor 559, which implements layer 3 and layer 2 functionality.

The controller/processor 559 can be associated with at least one memory 560 that stores program codes and data. The at least one memory 560 may be referred to as a computer-readable medium. In the UL, the controller/processor 559 provides demultiplexing between transport and logical channels, packet reassembly, deciphering, header decompression, and control signal processing to recover IP packets. The controller/processor 559 is also responsible for error detection using an ACK and/or NACK protocol to support HARQ operations.

Similar to the functionality described in connection with the transmission by the wireless communication device 510, the controller/processor 559 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 558 from a reference signal or feedback transmitted by the wireless communication device 510 may be used by the TX processor 568 to select the appropriate coding and modulation schemes, and to facilitate spatial processing. The spatial streams generated by the TX processor 568 may be provided to different antenna 552 via separate transmitters 554Tx. Each transmitter 554Tx may modulate an RF carrier with a respective spatial stream for transmission.

The transmission is processed at the wireless communication device 510 in a manner similar to that described in connection with the receiver function at the wireless communication device 550. Each receiver 518Rx receives a signal through its respective antenna 520. Each receiver 518Rx recovers information modulated onto an RF carrier and provides the information to a RX processor 570.

The controller/processor 575 can be associated with at least one memory 576 that stores program codes and data. The at least one memory 576 may be referred to as a computer-readable medium. The controller/processor 575 provides demultiplexing between transport and logical channels, packet reassembly, deciphering, header decompression, control signal processing to recover IP packets. The controller/processor 575 is also responsible for error detection using an ACK and/or NACK protocol to support HARQ operations.

At least one of the TX processor 568, the RX processor 556, and the controller/processor 559 may be configured to perform aspects in connection with the positioning calculation component 198 of FIG. 1.

At least one of the TX processor 516, the RX processor 570, and the controller/processor 575 may be configured to perform aspects in connection with the positioning calculation component 198 of FIG. 1.

Figure 6:
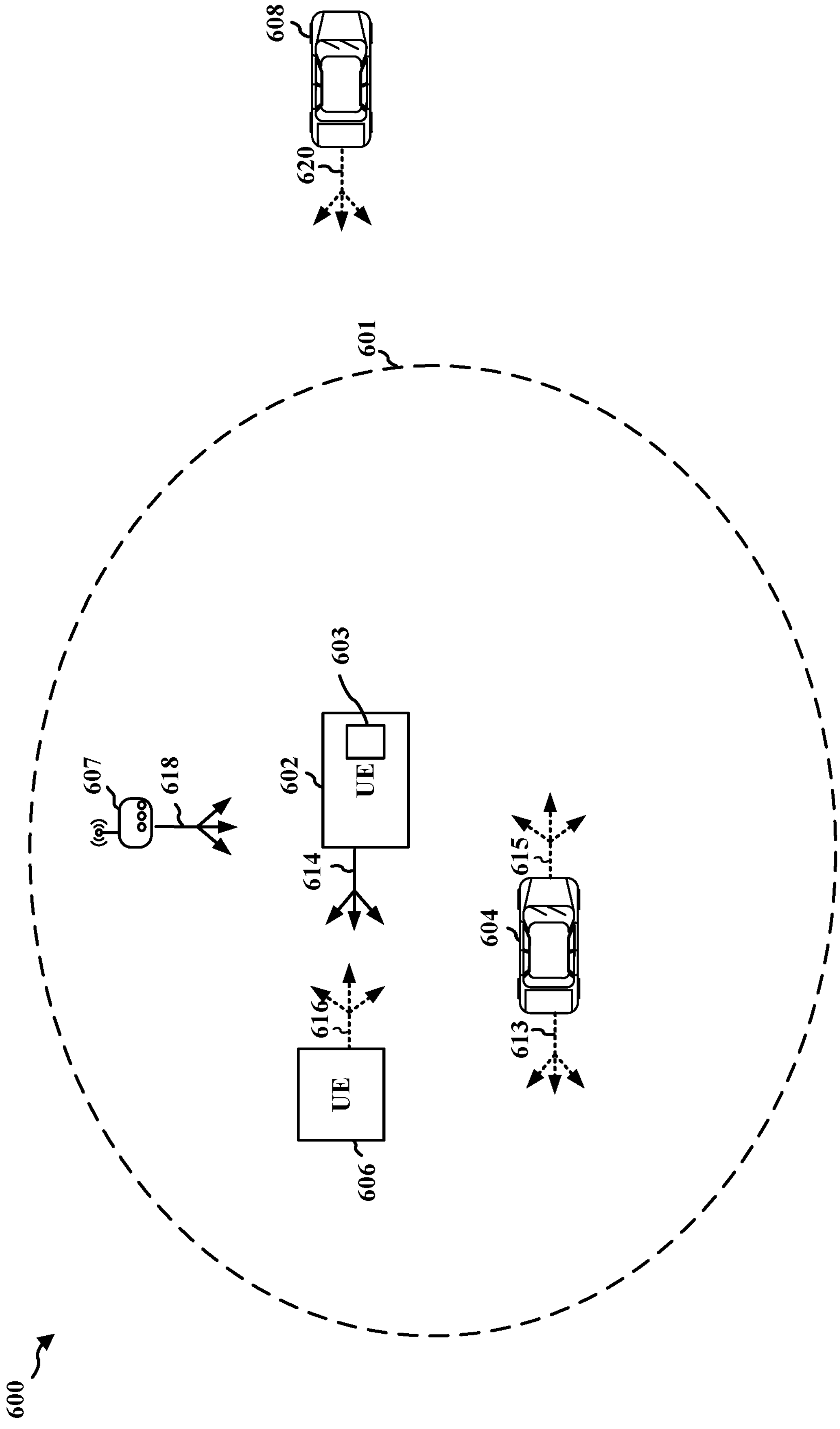
FIG. 6 illustrates an example of sidelink communication between devices, in accordance with aspects presented herein.

FIG. 6 illustrates an example 600 of sidelink communication between devices. The communication may be based on a slot structure including aspects described in connection with FIG. 4. For example, the UE 602 may transmit a transmission 614, e.g., including a control channel (e.g., PSCCH) and/or a corresponding data channel (e.g., PSSCH), that may be received by UEs 604, 606, 608. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 602, 604, 606, 608 may each be capable of sidelink transmission in addition to sidelink reception. Thus, UEs 604, 606, 608 are illustrated as transmissions 613, 615, 616, 620. The transmissions 613, 614, 615, 616, 620 may be unicast, broadcast or multicast to nearby devices. For example, UE 604 may transmit transmissions 613, 615 intended for receipt by other UEs within a range 601 of UE 604, and UE 606 may transmit transmissions 616. In some aspects, the RSU 607 may receive communication from and/or transmit communication 618 to UEs 602, 604, 606, 608. One or more of the UEs 602, 604, 606, 608 may include a positioning calculation component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field of the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

In some aspects, a UE 602 may have a set of sensors 603 (e.g., barometric pressure sensor/altimeter; motion sensor such as inertial measurement unit (IMU), gyroscope, and/or accelerometer(s); magnetometer, audio, camera, odometer, differential wheel tick counter, and/or other technologies used to collect environmental data associated with the UE 602) configured to sense a set of attributes about a vehicle associated with the UE 602. The set of sensors 603 may sense a speed of the vehicle (e.g., mph, kph), a weather pattern (e.g., humidity, wind speed, amount of rainfall), a road feature (e.g., presence/absence of a physical barrier along a road), a road attribute (e.g., how many lanes in a road, which lane the vehicle is in), obstacles about the UE 602, acceleration/deceleration patterns, and/or a distance the UE 602 has traveled within a period of time. The UE 602 may calculate a state of the UE 602 based on sensor information from the set of sensors 603, for example, determining whether the UE 602 exceeds a speed, whether the UE 602 is traveling below a speed, whether the UE 602 is not moving, and/or whether the UE 602 is surrounded by at least a threshold number of other vehicles within a threshold distance of the UE 602.

Figure 7:
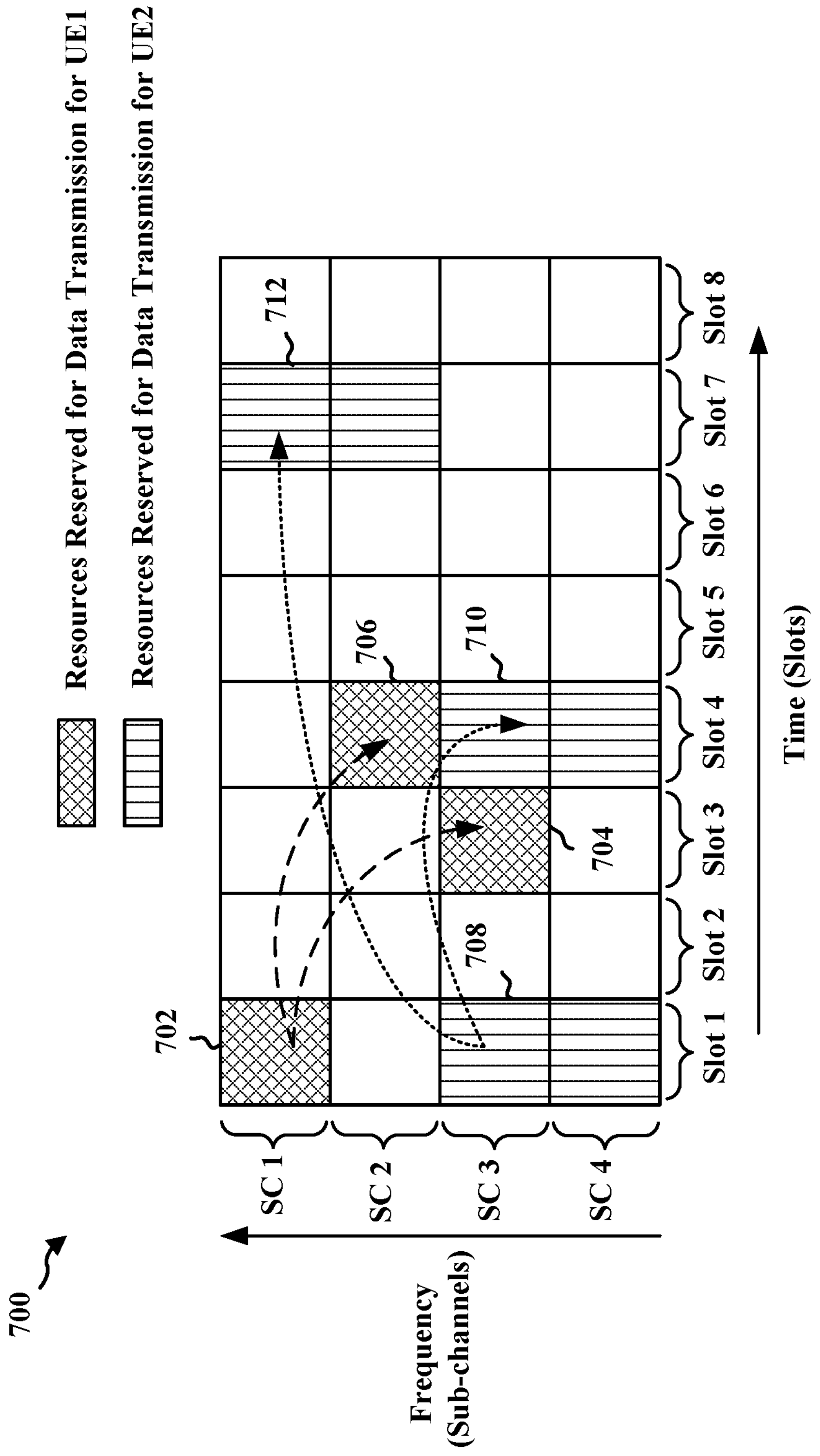
FIG. 7 illustrates examples of resource reservation for sidelink communication.

FIG. 7 is an example 700 of time and frequency resources showing reservations for sidelink transmissions. The resources may be included in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 700, which provides 32 available resource blocks in total. This window may also be referred to as a resource selection window.

A first UE ("UE1) may reserve a sub-channel (e.g., SC 1) in a current slot (e.g., slot 1) for a data transmission 702, and may reserve additional future slots within the window for data retransmissions (e.g., data retransmission 704 and data retransmission 706). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 7 illustrates that a second UE ("UE2") reserves resources in sub-channels SC 3 and SC 4 at time slot 1 for a data transmission 708, and reserves a data transmission 710 at time slot 4 using sub-channels SC 3 and SC 4, and reserves a data transmission 712 at time slot 7 using sub-channels SC 1 and SC 2 as shown by FIG. 7. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 7 illustrates resources being reserved for an initial transmission and two retransmissions, the reservation may be for an initial transmission and a single transmission or for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 7, the UE may transmit SCI reserving resources for data transmissions 708, 710, and 712.

Figure 8:
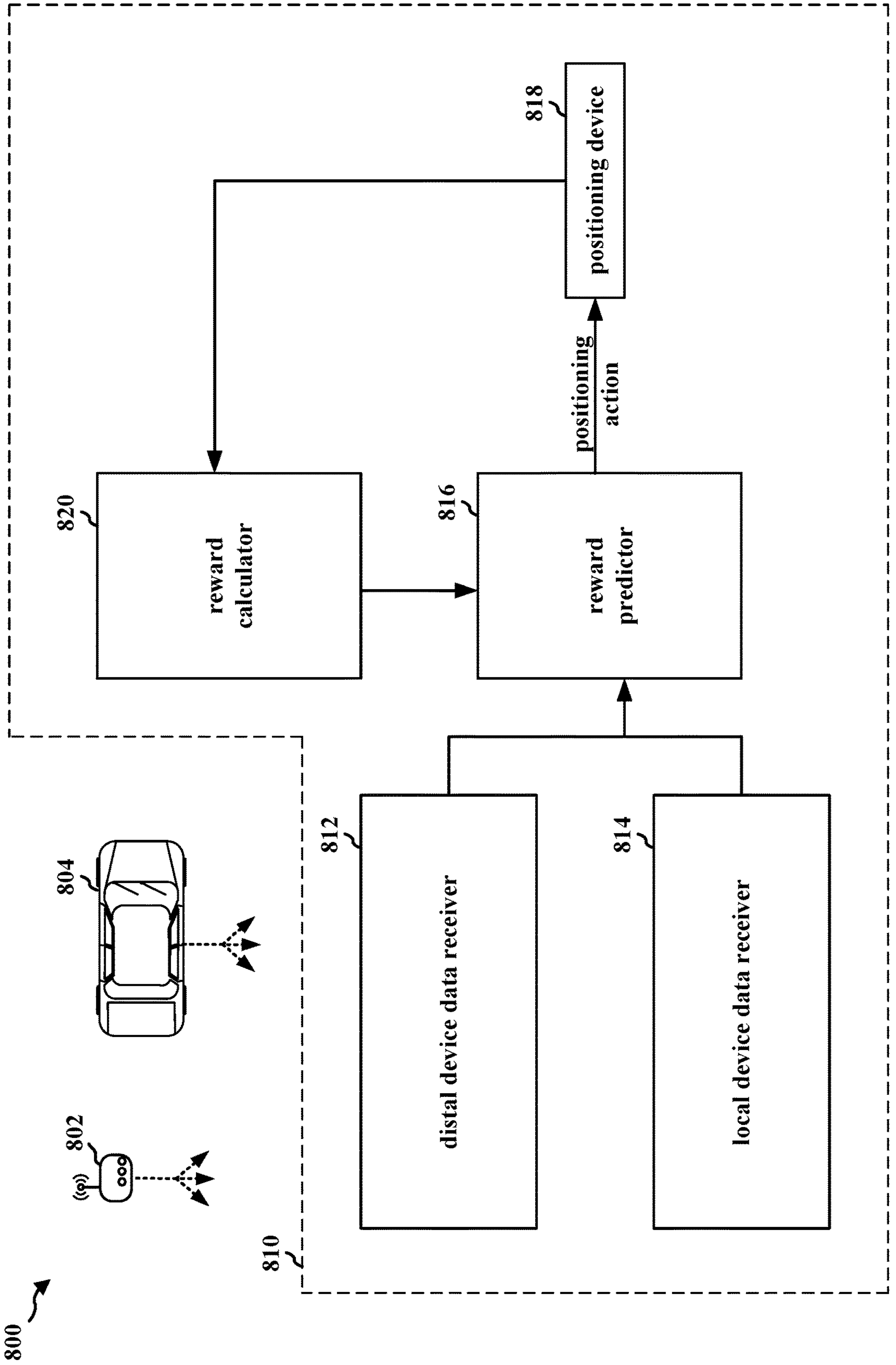
FIG. 8 illustrates an example of communication between devices for an opportunistic reward prediction system.

FIG. 8 is a diagram 800 that illustrates a wireless device 810 configured to opportunistically take actions to improve positioning for a positioning device 818 at the wireless device 810. The wireless device 810 may be a UE configured to communicate with a positioning device 818. The positioning device 818 may be a GNSS device configured to calculate a position of the wireless device 810, or a position of a device associated with the wireless device 810 (e.g., a vehicle functionally coupled to the wireless device 810). The positioning device 818 may be configured to calculate such a position based upon positioning signals received by the positioning device 818, for example GNSS signals transmitted by SPSs (e.g., GPSs, NTN base stations). The positioning device 818 may be configured to function for hours under various environments, for example an open sky environment, a semi-urban environment, an urban canyon environment, an under-bridge environment, or a parked environment. While the positioning device 818 is functioning, the positioning device 818 may accumulate various errors, for example a satellite vehicle (SV) non-line of sight (NLOS) error, a pseudo-random (PR) measurement error, a timing error estimate, a suboptimal selection of SVs, a wrong filter initialization error, a position divergence, a spurious measurement/signal (which may result in degraded quality of service (QOS)), a high temperature of a sensor (e.g., crystal oscillator (XO)), an incorrect search space, a velocity error, and/or a heading error. The positioning device 818 may correct such errors by performing a periodic soft/hard reset, or by performing another error recovery procedure. Moreover, during some time periods, the positioning device 818 may be able to maintain its performance while using less power (e.g., entering a low-power mode that performs periodic fixes using longer time periods, receiving and measuring positioning signals from less positioning signal transmission devices (e.g., a subset of SVs)). In some aspects, the wireless device 810 may be configured to opportunistically improve the performance of the positioning device 818 by taking optimal actions (e.g., performing a soft reset, entering a low-power mode) to improve the quality and/or availability of positioning by the positioning device 818.

The wireless device 810 may be configured to collect environmental data associated with the wireless device 810 to calculate an accurate state of the wireless device 810. In some aspects, the wireless device 810 may have a distal device data receiver 812 configured to collect environmental data associated with the wireless device 810 from one or more distal devices, for example another UE 804, an on-board unit (OBU) 805 of a vehicle, or an RSU 802. The RSU 802 may be configured to aggregate data from a plurality of UEs within a zone of the RSU 802, or may be configured to relay data and/or requests for data between UEs within a zone of the RSU 802. The distal device data receiver 812 may be configured to receive data via a D2D signal, for example a sidelink signal or a V2X signal. The distal device data receiver 812 may be configured to receive data from one or more distal devices via a transceiver at the wireless device 810. The distal device data receiver 812 may be configured to receive, for example, at least one of real-time traffic information for an area associated with the wireless device 810 (e.g., within a threshold distance of an estimated location of the wireless device 810), traffic signal duration and/or timing information for traffic signals on a predicted path of the wireless device 810, path history of an OBU (e.g., speed of the OBU at different times/time intervals, location of the OBU at different times/time intervals, availability of positioning signals of the OBU associated with historical locations of the OBU), a real-time map of an area associated with the wireless device 810 (e.g., may include road closure information), a high-definition (HD) map of an area associated with the wireless device 810, a three-dimensional (3-D) map of a building associated with the wireless device 810, or RSU topology within an area associated with the wireless device 810.

In some aspects, the wireless device 810 may have a local device data receiver 814 configured to collect environmental data associated with the wireless device 810 from one or more components of the wireless device 810, for example the positioning device 818 or a WWAN transceiver. The local device data receiver 814 may be configured to collect state information about a device or a component of the wireless device 810. The local device data receiver 814 may be configured to receive, for example, at least one of GNSS-based context of a GNSS device (e.g., a position, velocity, time (PVT) calculation, an error estimate, a signal-to-noise ratio (SNR), a status of which SVs are visible by the GNSS device, a jamming artifact estimate), status of a WWAN device (e.g., idle, active Tx, active Rx), a usage indicator of a CPU (e.g., an active concurrency use case), an XO calibration status, an indicator of a power state of the wireless device 810 (e.g., active state, low-power state, suspend/sleep mode, parking mode), an indicator of a battery level of the wireless device 810 (e.g., full power, 80% power, 50% power), or a status indicator of a sensor calibration at the wireless device 810.

The wireless device 810 may have a reward predictor 816 that may be configured to accept at least some of the received data from one or both of the distal device data receiver 812 or the local device data receiver 814. The wireless device 810 may normalize at least some of the received data before outputting the received data to the reward predictor 816. The reward predictor 816 may feed the input data through a predictor model, for example a reinforcement learning (RL) agent or a contextual multi-arm bandit, which is configured to identify which opportunities are available for the positioning device 818 to take one of a plurality of actions based on a context or state of the positioning device 818. In some aspects, the reward predictor 816 may calculate a state of the positioning device 818, and may determine that the positioning device 818 may take one of a plurality of positioning actions based on the calculated state.

For example, the reward predictor 816 may calculate that the wireless device 810 is in a static mode (e.g., stopped at a traffic signal for at least a threshold period of time, in congested traffic), and may determine that the positioning device 818 may run parallel hypothesis to determine which GNSS states are in consensus based on multiple hypothesis or may perform a hard/soft reset to attempt to remove accumulated biases or to transition to an optimal state.

In another example, the reward predictor 816 may calculate that the wireless device 810 will be traveling on a straight road segment for a threshold period of time based on map and OBU data received via the distal device data receiver 812. The reward predictor 816 may also calculate that the wireless device 810 has high CPU usage and good sensor calibration status for a deep reinforcement (DR) fix. The reward predictor 816 may then determine that the positioning device 818 may transition to a low-power mode, may transition to a dynamic time between fixes (TBF) (e.g., TBF∈[0.1, 10] s), may reset the GNSS state and use sensor-aiding during recovery, or may de-weigh GNSS measurements and assign more weights to sensor-aiding recovery procedures.

In another example, the reward predictor 816 may calculate that the wireless device 810 is in a parking garage environment (e.g., severely restricted reception of signals from SVs, HD map illustrating that the wireless device 810 is in a parking garage), and may determine that the positioning device 818 may sub-select regional SVs based on a regional constellation or based on visible direct LOS SVs after building a 3-D model of interference objects about the wireless device 810 (e.g., by utilizing a 3-D model of the parking garage and an estimated location of the wireless device 810).

In some aspects, the wireless device 810 may calculate an expected reward value for each of a set of potential positioning actions based on the calculated state using a reward calculator 820. The reward calculator 820 may base the calculation of the reward based on an action taken, a previous state of the positioning device 818, and a resultant state of the positioning device 818.

Figure 9:
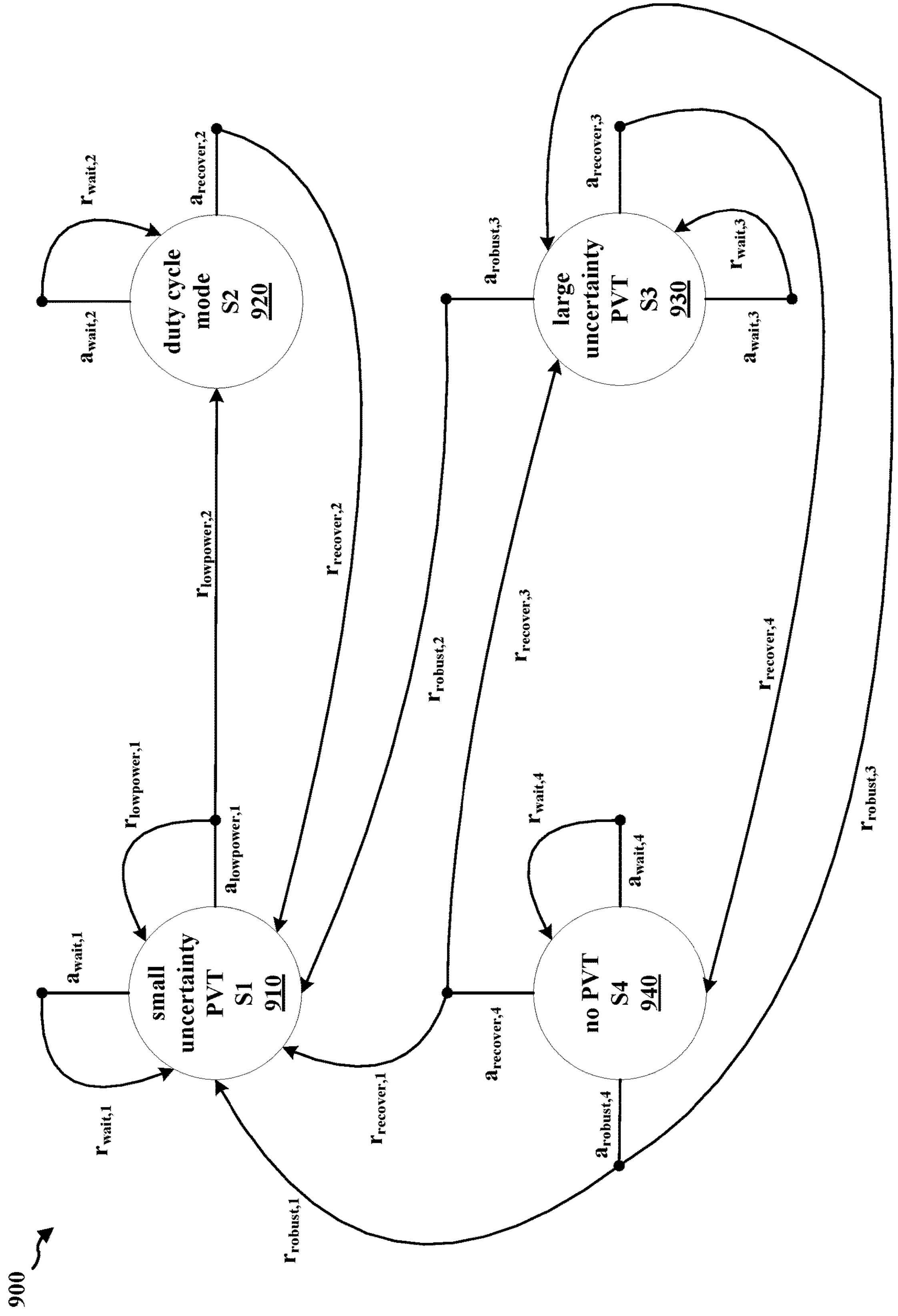
FIG. 9 illustrates an example of a set of states for a positioning device opportunistic action system and a set of actions and corresponding rewards for the set of actions.

FIG. 9 is a diagram 900 that illustrates a set of exemplary states, potential actions, and estimated rewards for each potential action for a positioning device opportunistic action system. A UE may have four states, shown in diagram 900 as states S1 910, S2 920, S3 930, and S4 940. S1 (i.e., S1 910) may represent a state of a positioning device that reports a set of calculated PVT values with a calculated uncertainty/error value that is less than or equal to a threshold value. S2 (i.e., S2 920) may represent a state of a positioning device that has transitioned into a duty-cycle mode (i.e., a low-power mode or a dynamic TBF mode). S3 (i.e., S3 930) may represent a state of a positioning device that reports a set of calculated PVT values with a calculated uncertainty/error value that is greater than or equal to the threshold value. S4 (i.e., S4 940) may represent a state of a positioning device that is not able to report a calculated set of PVT values (e.g., no reception of SVs, positioning device was just activated). While the diagram 900 shows four states, a positioning device may have many more than four states when analyzing a positioning device using multiple datapoints gleaned from local and distal data sources. The UE may be configured to determine what state the positioning device is in by operating the positioning device, and by analyzing environmental input data associated with the UE from various data sources, for example distal data sources (e.g., an OBU, an RSU, another UE) or local data sources (e.g., a local sensor, a local accelerometer, a local odometer).

The UE may determine a set of potential positioning actions for the positioning device based on the state of the positioning device. For example, the positioning device may wait or do nothing ($a_{wait,k}$ for a state Sk) for a period of time or until an event is detected (e.g., the UE receives a wake signal, the UE accelerates to a speed greater or equal to a threshold value), the positioning device may switch to a duty cycle or a low-power mode ($a_{lowpower,k}$), the positioning device may initiate a recovery cycle ($a_{recover,k}$), or a soft reset, or the positioning device may initiate a robust recovery cycle ($a_{robust,k}$), for example performing a robust filter engagement of SVs or robust measurement selection of subsamples of positioning signals.

For each positioning action taken, the UE may transition to a different state, which may be assigned a reward value. The reward value may be higher for transitions that are beneficial to the positioning device (e.g., transitioning to a duty cycle state which uses less power) and the reward value may be lower for transitions that are detrimental to the positioning device (e.g., transitioning from a state with PVT that reports a small uncertainty value (e.g., S1) to a state with PVT that reports a high uncertainty value (e.g., S3). Table 2 below illustrates examples of possible reward values for the diagram 900.

TABLE 1

| Numerology, SCS, and CP | | |
|---|---|---|
| reward | reward value | Description |
| $r_{wait,\ 1}$ | +1 | Action: $a_{wait,\ 1}$; Current state: S1; Next state: S1 |
| $r_{low\text{-}power,\ 1}$ | 0 | Action: $a_{low\text{-}power,\ 1}$; Current state: S1; Next state: S1 |
| $r_{recover,\ 1}$ | +3 | Action: $a_{recover,\ 4}$; Current state: S4; Next state: S1 |
| $r_{recover,\ 2}$ | 0 | Action: $a_{recover,\ 2}$; Current state: S2; Next state: S1 |
| $r_{robust,\ 1}$ | +3 | Action: $a_{robust,\ 4}$; Current state: S4; Next state: S1 |
| $r_{wait,\ 2}$ | +3 | Action: $a_{wait,\ 2}$; Current state: S2; Next state: S2 |
| $r_{low\text{-}power,\ 2}$ | +3 | Action: $a_{low\text{-}power,\ 1}$; Current state: S1; Next state: S2 |
| $r_{wait,\ 3}$ | −1 | Action: $a_{wait,\ 3}$; Current state: S3; Next state: S3 |
| $r_{recover,\ 3}$ | 0 | Action: $a_{recover,\ 4}$; Current state: S4; Next state: S3 |
| $r_{robust,\ 3}$ | +2 | Action: $a_{robust,\ 4}$; Current state: S4; Next state: S3 |
| $r_{wait,\ 4}$ | −10 | Action: $a_{wait,\ 4}$; Current state: S4; Next state: S4 |
| $r_{recover,\ 4}$ | −5 | Action: $a_{recover,\ 3}$; Current state: S3; Next state: S4 |

The UE may use reinforcement learning (RL) or a recurrent neural network (RNN) to calculate an expected reward value for taking an action. For example, for state S4, the action $a_{recover,4}$ may result in an $r_{recover,1}$ value of +3 to S1 or an $r_{recover,3}$ value of 0 to S3. The UE may analyze that the action $a_{recover,4}$ for state S4 may result in an $r_{recover,1}$ value of +3 to S1 80% of the time, and may result in an $r_{recover,3}$ value of 0 to S3 20% of the time, resulting in an expected reward value of +2.4 for taking the action $a_{recover,4}$ for state S4. The UE may calculate an expected reward value for each potential positioning action, and then may select and perform the potential positioning action with the largest expected reward value. Where the expected reward value for two potential positioning actions are equal, the UE may randomly select an action, or may use an algorithm to break the tie, for example selecting an action with the highest max reward value for each of the potential positioning actions.

Figure 10:
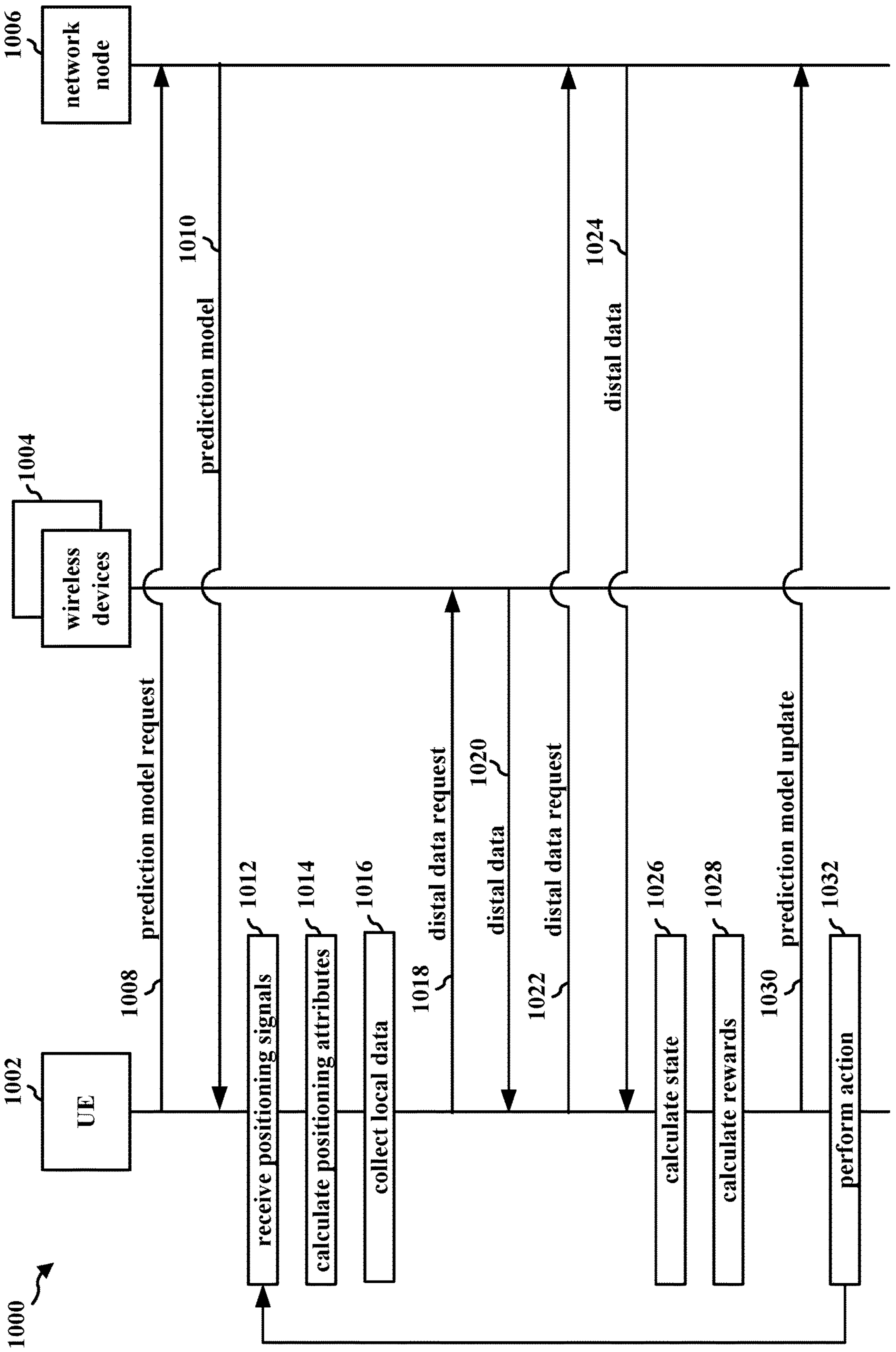
FIG. 10 illustrates an example of a connection flow diagram for a UE configured to take opportunistic actions for a positioning device.

FIG. 10 illustrates an example of a connection flow diagram 1000 for a UE 1002 configured to take opportunistic actions for a positioning device at the UE 1002. The UE 1002 may include a UE that is associated with a vehicle, for example a UE that is functionally connected to the vehicle or is incorporated with the vehicle. The network node 1006 may include a base station, a TRP, or an RSU. The network node 1006 may be configured to communicate with the UE 1002 via a Uu signal or a sidelink signal. The set of wireless devices 1004 may include distal devices that may be configured to transmit data associated with the UE 1002 to the UE 1002, for example other UEs, OBUs or RSUs. The set of wireless devices 1004 may be configured to communicate with the UE 1002 via a sidelink signal, for example via a V2X interface. The UE 1002 may transmit a prediction model request 1008 to the network node 1006. The network node 1006 may receive the prediction model request 1008 from the UE 1002. The prediction model request 1008 may include a request for a prediction model that the UE 1002 may use to determine what potential positioning actions a positioning device may use for a state, for example a neural network (NN) or an RL model. The prediction model may have default values for expected reward probabilities, for example values of previously trained prediction models, or a weighted average of possible rewards for each potential positioning action. The network node 1006 may transmit a prediction model 1010 to the UE 1002. The UE 1002 may receive the prediction model 1010 from the network node 1006. The network node may transmit the prediction model 1010 based on the prediction model request 1008. The network node 1006 may periodically transmit the prediction model 1010 based on a schedule. For example, the network node 1006 may be configured to periodically transmit prediction models to a set of UEs within a zone associated with the positioning model.

At 1012, the UE 1002 may receive a set of positioning signals from a set of positioning signal transmission devices, for example GNSS signals from a set of GPSs or SVs, and/or PRSs from a set of TRPs or low-elevation orbit (LEO) non-terrestrial network (NTN) satellites. At 1014, the UE 1002 may calculate a set of positioning attributes based on the received set of positioning signals, such as PVT values and a calculated uncertainty value. A positioning device at the UE 1002, such as a GNSS device, a GNSS receiver, or a PVT estimator, may calculate the set of positioning attributes.

The UE 1002 may collect environmental data to use to calculate its state. For example, at 1016, the UE 1002 may collect local data from a set of components and/or devices at the UE 1002, for example CPU utilization or odometer data. The UE 1002 may transmit a distal data request 1018 to the set of wireless devices 1004. The set of wireless devices 1004 may receive the distal data request 1018 from the UE 1002. The set of wireless devices 1004 may transmit distal data 1020 to the UE 1002. The UE 1002 may receive the distal data 1020 from the set of wireless devices 1004. The set of wireless devices 1004 may be configured to transmit the distal data 1020 in response to receiving the distal data request 1018. The set of wireless devices 1004 may be configured to periodically transmit the distal data 1020 to UEs within a range of each wireless device, or associated with a zone. The UE 1002 may transmit a distal data request 1022 to the network node 1006. The network node 1006 may receive the distal data request 1022 from the UE 1002 The network node 1006 may transmit distal data 1024 to the UE 1002. The UE 1002 may receive the distal data 1024 from the network node 1006. The network node 1006 may be configured to transmit the distal data 1024 in response to receiving the distal data request 1022. The network node 1006 may be configured to periodically transmit the distal data 1024 to UEs, for example any UEs that the network node 1006 serves or UEs within a zone associated with the distal data.

At 1026, the UE 1002 may calculate a state of the positioning device associated with the UE 1002 based on the positioning attributes calculated at 1014 and/or based on any environmental data collected by the UE 1002. The UE 1002 may determine which potential positioning actions the positioning device may take for the calculated state. At 1028, the UE 1002 may calculate rewards for the potential positioning actions. The UE 1002 may calculate the rewards based on historical data (e.g., RL). If the UE 1002 took a previous action, the UE 1002 may incorporate such historical data in its decision to estimate an expected reward value for each of the potential positioning actions that the positioning device may take. In some aspects, the UE 1002 may transmit a prediction model update 1030 to the network node 1006 to allow the network node 1006 to update any prediction models it may transmit to other UEs. The prediction model update 1030 may include updated expected reward calculations and/or statistics of action/state transitions made by the UE 1002.

At 1032, the UE 1002 may perform the positioning action that is associated with the potential positioning action having the highest calculated expected reward value. In this manner, the UE 1002 may opportunistically select optimal positioning actions, improving positioning fixes calculated by a positioning device associated with the UE 1002. The UE 1002 may repeat this process over time, for example via a federated RL method, allowing for the UE 1002 to improve the accuracy and reliability of its prediction of expected rewards for each potential positioning action over time.

Figure 11:
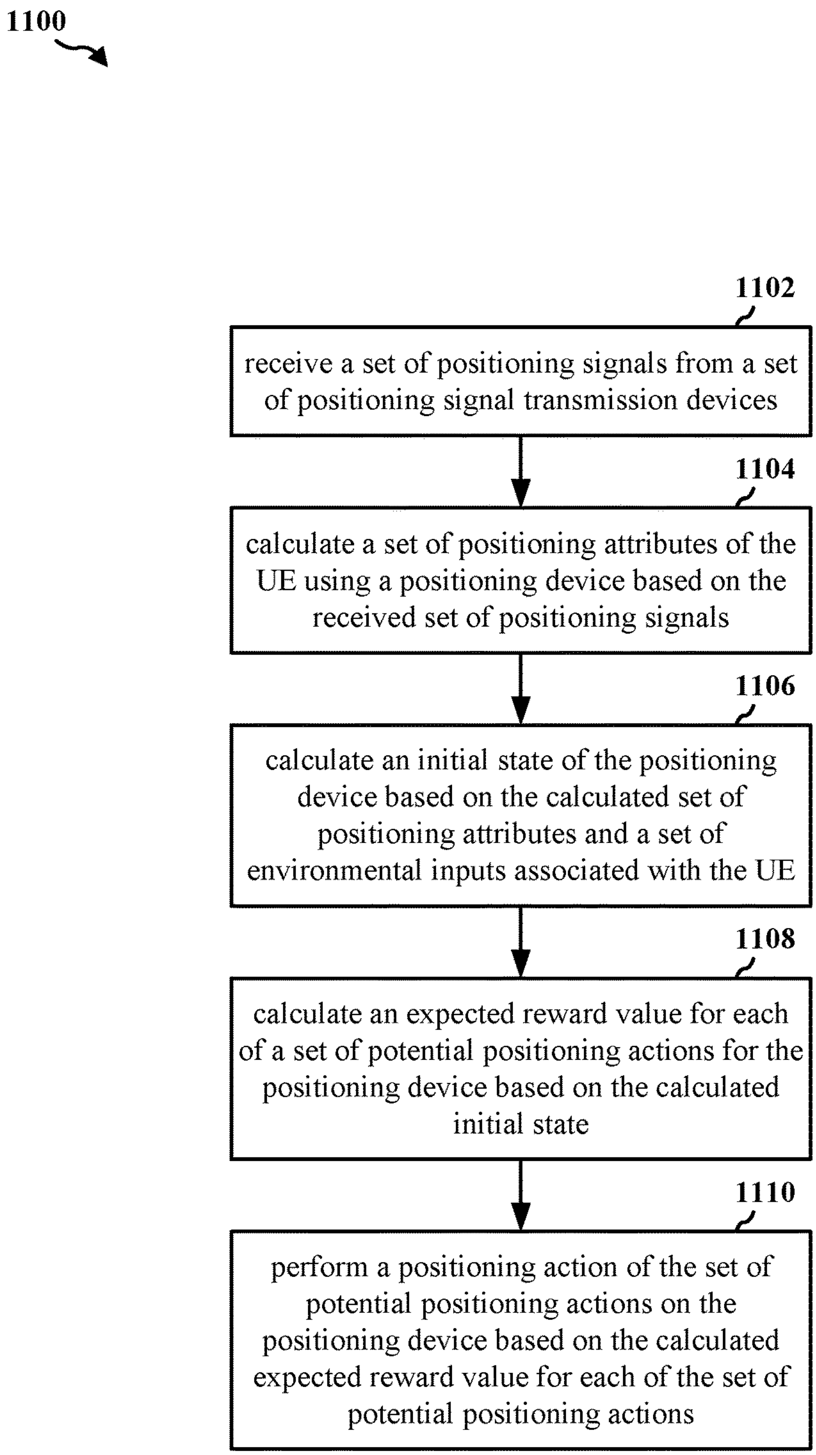
FIG. 11 is a flowchart of a method of wireless communication.

FIG. 11 is a flowchart 1100 of a method of wireless communication. The method may be performed by a UE (e.g., the UE 104, the UE 350, the UE 602, the UE 604, the UE 606, the UE 608, the UE 1002; the wireless communication device 510, the wireless communication device 550; the apparatus 1204). At 1102, the UE may receive a set of positioning signals from a set of positioning signal transmission devices. For example, 1102 may be performed by the UE 1002 in FIG. 10, which may, at 1012, receive a set of positioning signals (e.g., GNSS signals, GPS signals, PRSs) from a set of positioning signal transmission devices (e.g., GNSS transmission devices, GPSs, TRPs). Moreover, 1102 may be performed by the component 198 in FIG. 1, 3, 5, or 12.

At 1104, the UE may calculate a set of positioning attributes of the UE using a positioning device based on the received set of positioning signals. For example, 1104 may be performed by the UE 1002 in FIG. 10, which may, at 1014, calculate a set of positioning attributes of the UE 1002 using a positioning device (e.g., a GNSS receiver) based on the received set of positioning signals. Moreover, 1104 may be performed by the component 198 in FIG. 1, 3, 5, or 12.

At 1106, the UE may calculate an initial state of the positioning device based on the calculated set of positioning attributes and a set of environmental inputs associated with the UE. For example, 1106 may be performed by the UE 1002 in FIG. 10, which may, at 1026, calculate an initial state of the positioning device based on the calculated set of positioning attributes and a set of environmental inputs (e.g., local data collected at 1016, distal data 1020, or distal data 1024) associated with the UE 1002. Moreover, 1106 may be performed by the component 198 in FIG. 1, 3, 5, or 12.

At 1108, the UE may calculate an expected reward value for each of a set of potential positioning actions for the positioning device based on the calculated initial state. For example, 1108 may be performed by the UE 1002 in FIG. 10, which may, at 1028, calculate an expected reward value for each of a set of potential positioning actions for the positioning device based on the calculated initial state. Moreover, 1108 may be performed by the component 198 in FIG. 1, 3, 5, or 12.

At 1110, the UE may perform a positioning action of the set of potential positioning actions on the positioning device based on the calculated expected reward value for each of the set of potential positioning actions. For example, 1110 may be performed by the UE 1002 in FIG. 10, which may, at 1032, perform a positioning action of the set of potential positioning actions on the positioning device based on the calculated expected reward value for each of the set of potential positioning actions. Moreover, 1110 may be performed by the component 198 in FIG. 1, 3, 5, or 12.

Figure 12:
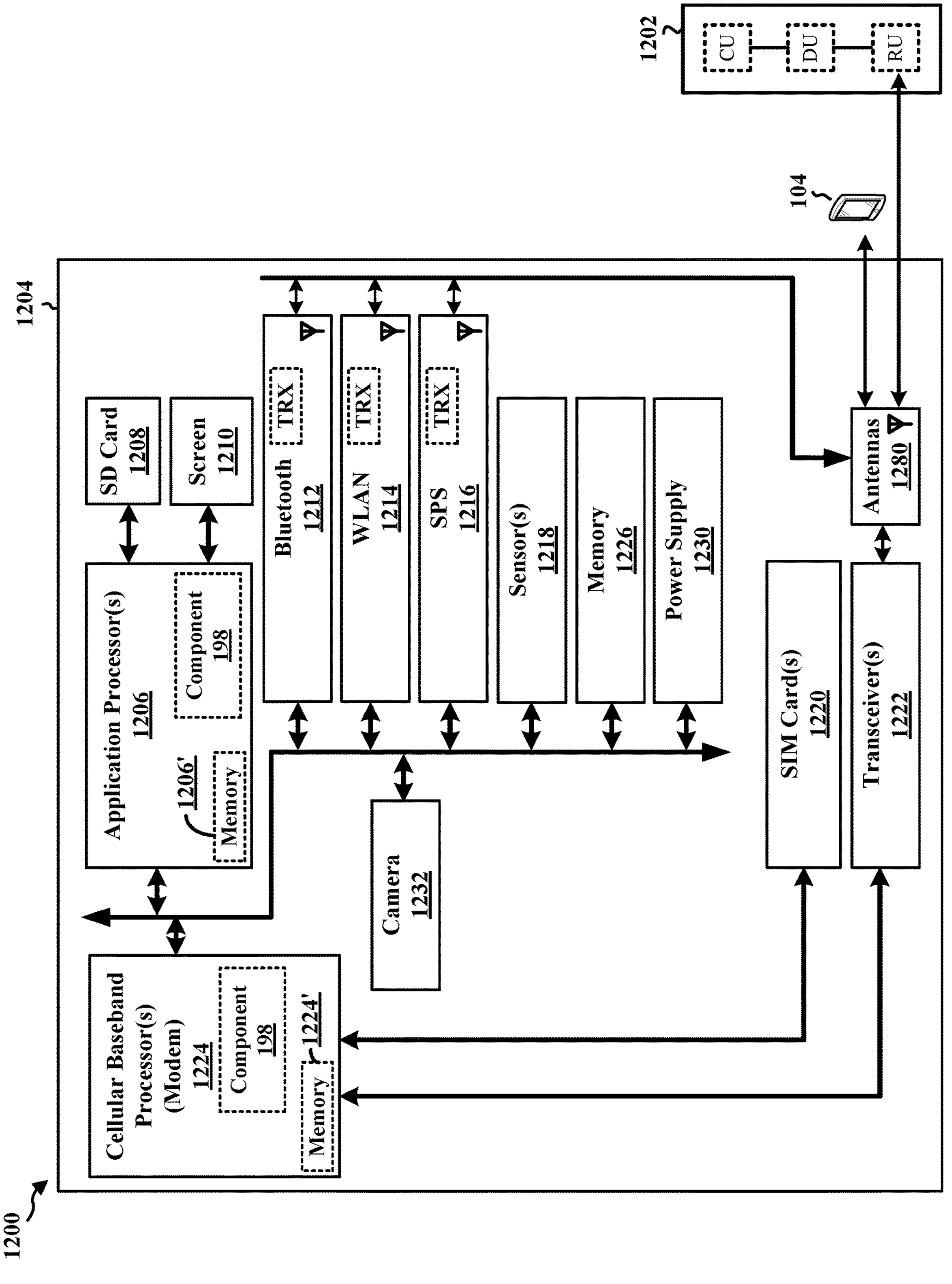
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) 1224 communicates through the transceiver(s) 1222 via one or more antennas 1280 with the UE 104 and/or with an RU associated with a network entity 1202. The cellular baseband processor(s) 1224 and the application processor(s) 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The cellular baseband processor(s) 1224 and the application processor(s) 1206 are configured to perform the various functions described supra based at least in part of the information stored in the memory. That is, the cellular baseband processor(s) 1224 and the application processor(s) 1206 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1224/application processor(s) 1206 when executing software. The cellular baseband processor(s) 1224/application processor(s) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) 1224 and/or the application processor(s) 1206, and in another configuration, the apparatus 1204 may be the entire UE (e.g., see UE 350 of FIG. 3) and include the additional modules of the apparatus 1204.

As discussed supra, the component 198 may be configured to receive a set of positioning signals from a set of positioning signal transmission devices. The component 198 may be configured to calculate a set of positioning attributes of the UE 104 using a positioning device. The component 198 may be configured to calculate an initial state of the positioning device based on the calculated set of positioning attributes and a set of environmental inputs associated with the UE 104. The component 198 may be configured to calculate an expected reward value for each of a set of potential positioning actions for the positioning device based on the calculated initial state. The component 198 may be configured to perform a positioning action of the set of potential positioning actions on the positioning device based on the calculated expected reward value for each of the set of potential positioning actions. The component 198 may be within the cellular baseband processor(s) 1224, the application processor(s) 1206, or both the cellular baseband processor(s) 1224 and the application processor(s) 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) 1224 and/or the application processor(s) 1206, may include means for receiving a set of positioning signals from a set of positioning signal transmission devices. The apparatus 1204 may include means for calculating a set of positioning attributes of the apparatus 1204 using a positioning device based on the received set of positioning signals. The apparatus 1204 may include means for calculating an initial state of the positioning device based on the calculated set of positioning attributes and a set of environmental inputs associated with the apparatus 1204. The apparatus 1204 may include means for calculating an expected reward value for each of a set of potential positioning actions for the positioning device based on the calculated initial state. The apparatus 1204 may include means for performing a positioning action of the set of potential positioning actions on the positioning device based on the calculated expected reward value for each of the set of potential positioning actions. The apparatus 1204 may include means for receiving a second set of positioning signals from a second set of positioning signal transmission devices. The apparatus 1204 may include means for calculating a second set of positioning attributes of the UE using the positioning device based on the second set of positioning signals after the performance of the positioning action. The apparatus 1204 may include means for calculating a resultant state of the positioning device based on the calculated second set of positioning attributes and a second set of environmental inputs associated with the apparatus 1204. The apparatus 1204 may include means for revising the expected reward value for the positioning action of the set of potential positioning actions for the positioning device based on the calculated resultant state of the apparatus 1204. The set of environmental inputs may include at least one of (a) live traffic information associated with an estimated location of the apparatus 1204, (b) path history of an OBU device, (c) map information associated with the estimated location of the apparatus 1204, (d) a CPU usage metric associated with the apparatus 1204, (e) a wireless traffic metric usage metric associated with the apparatus 1204, (f) a sensor calibration state metric associated with the apparatus 1204, (g) a set of sensor data associated with the apparatus 1204, or (h) a power metric associated with the apparatus 1204. The apparatus 1204 may include means for receiving a wireless signal including an indicator of at least one of the live traffic information, the path history, or the map information. The wireless signal may include at least one of a sidelink signal or a V2X signal. The apparatus 1204 may include means for receiving the wireless signal by receiving the wireless signal from at least one of a second UE, an OBU of a vehicle, or an RSU. The apparatus 1204 may include means for collecting the set of sensor data from a set of sensors at the apparatus 1204, or at a set of sensors at a vehicle associated with the apparatus 1204. The set of sensors may include at least one of (a) an accelerometer, (b) a camera, (c) an IMU, or (d) an odometer. The set of potential positioning actions may include at least one of (a) refraining from performing the positioning action until an event is detected by the apparatus 1204, (b) switching to a low-power mode of the apparatus 1204, (c) resetting the positioning device, (d) selecting a first subset of the set of positioning signal transmission devices for the calculation of the set of positioning attributes, or (e) selecting a second subset of the set of positioning signal transmission devices for the calculation of the set of positioning attributes. The positioning device may include a GNSS device or a GPS device. The set of positioning signal transmission devices may include a set of non-terrestrial satellites (NTN), orbital satellites, low-earth orbital (LEO) satellites, or GPSs. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, may send the data to a component of the device that transmits the data, or may send the data to a component of the device. A device configured to "obtain" data, such as a transmission, signal, or message, may receive, for example with a transceiver, may obtain the data from a component of the device that receives the data, or may obtain the data from a component of the device. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of improving wireless positioning recovery at a user equipment (UE), comprising: receiving a set of positioning signals from a set of positioning signal transmission devices; calculating a set of positioning attributes of the UE using a positioning device based on the received set of positioning signals; calculating an initial state of the positioning device based on the calculated set of positioning attributes and a set of environmental inputs associated with the UE; calculating an expected reward value for each of a set of potential positioning actions for the positioning device based on the calculated initial state; and performing a positioning action of the set of potential positioning actions on the positioning device based on the calculated expected reward value for each of the set of potential positioning actions.

Aspect 2 is the method of aspect 1, further comprising: receiving a second set of positioning signals from a second set of positioning signal transmission devices; calculating a second set of positioning attributes of the UE using the positioning device based on the second set of positioning signals after the performance of the positioning action; calculating a resultant state of the positioning device based on the calculated second set of positioning attributes and a second set of environmental inputs associated with the UE; and revising the expected reward value for the positioning action of the set of potential positioning actions for the positioning device based on the calculated resultant state of the UE.

Aspect 3 is the method of either of aspects 1 or 2, wherein the set of environmental inputs comprise at least one of: live traffic information associated with an estimated location of the UE; path history of an on-board unit (OBU) device; map information associated with the estimated location of the UE; a central processing unit (CPU) usage metric associated with the UE; a wireless traffic metric usage metric associated with the UE; a sensor calibration state metric associated with the UE; a set of sensor data associated with the UE; or a power metric associated with the UE.

Aspect 4 is the method of aspect 3, further comprising: receiving a wireless signal comprising an indicator of at least one of the live traffic information, the path history, or the map information.

Aspect 5 is the method of aspect 4, wherein the wireless signal comprises at least one of a sidelink signal or a vehicle to everything (V2X) signal.

Aspect 6 is the method of either of aspects 4 or 5, wherein receiving the wireless signal comprises receiving the wireless signal from at least one of a second UE, an on-board unit (OBU) of a vehicle or a road side unit (RSU).

Aspect 7 is the method of any of aspects 3 to 6, further comprising collecting the set of sensor data from a set of sensors at the UE.

Aspect 8 is the method of aspect 7, wherein the set of sensors comprise at least one of: an accelerometer; a camera; an inertial measurement unit (IMU); or an odometer.

Aspect 9 is the method of any of aspects 1 to 8, wherein the set of potential positioning actions comprise at least one of: refraining from performing the positioning action until an event is detected by the UE; switching to a low-power mode of the UE; resetting the positioning device; selecting a first subset of the set of positioning signal transmission devices for the calculation of the set of positioning attributes; or selecting a second subset of the set of positioning signal transmission devices for the calculation of the set of positioning attributes.

Aspect 10 is the method of any of aspects 1 to 9, wherein the positioning device comprises a global navigation satellite system (GNSS) device.

Aspect 11 is the method of any of aspects 1 to 10, wherein the set of positioning signal transmission devices comprise a set of global positioning satellites (GPSs).

Aspect 12 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 11.

Aspect 13 is an apparatus for wireless communication, comprising means for performing each step in the method of any of aspects 1 to 11.

Aspect 14 is the apparatus of any of aspects 1 to 11, further comprising a transceiver (e.g., functionally connected to the at least one processor of Aspect 12) configured to receive or to transmit in association with the method of any of aspects 1 to 11.

Aspect 15 is a computer-readable medium (e.g., a non-transitory computer-readable medium) storing computer executable code, the code when executed by at least one processor causes the at least one processor, individually or in any combination, to perform the method of any of aspects 1 to 11.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

receive a set of positioning signals from a set of positioning signal transmission devices;

calculate a set of positioning attributes of the UE using a positioning device based on the received set of positioning signals;

receive, from a set of wireless devices located distal from the UE, a set of distal data comprising a set of environmental inputs associated with the UE;

calculate an initial state of the positioning device based on the calculated set of positioning attributes and the received set of distal data;

calculate an expected reward value for each of a set of potential positioning actions for the positioning device based on the calculated initial state; and perform a positioning action of the set of potential positioning actions on the positioning device based on the calculated expected reward value for each of the set of potential positioning actions.

2. The apparatus of claim 1, wherein the at least one processor is further configured to:

receive a second set of positioning signals from a second set of positioning signal transmission devices;

calculate a second set of positioning attributes of the UE using the positioning device based on the second set of positioning signals after the performance of the positioning action;

receive, from at least one wireless device of the set of wireless devices, a second set of distal data comprising a second set of environmental inputs associated with the UE;

calculate a resultant state of the positioning device based on the calculated second set of positioning attributes and the second set of distal data; and revise the expected reward value for the positioning action of the set of potential positioning actions for the positioning device based on the calculated resultant state of the UE.

3. The apparatus of claim 1, wherein the set of environmental inputs comprises at least one of:

live traffic information associated with an estimated location of the UE;

path history of an on-board unit (OBU) device associated with at least one wireless device of the set of wireless devices; or map information associated with the estimated location of the UE.

4. The apparatus of claim 1, wherein the at least one processor is further configured to:

determine a set of local data comprising a second set of environmental inputs associated with the UE, wherein the second set of environmental inputs comprises at least one of:

a central processing unit (CPU) usage metric associated with a CPU of the UE;

a wireless traffic metric usage metric associated with a transceiver of the UE;

a sensor calibration state metric associated with a sensor at the UE;

a set of sensor data associated with a set of sensors at the UE; or a power metric associated with a power consumption of the UE, wherein, to calculate the initial state of the positioning device based on the calculated set of positioning attributes and the received set of distal data, the at least one processor is configured to:

calculate the initial state of the positioning device further based on the determined set of local data, wherein the set of local data is collected from data sources local to the UE.

5. The apparatus of claim 1, wherein, to receive, from the set of wireless devices, the set of distal data comprising the set of environmental inputs associated with the UE, the at least one processor is configured to:

receive at least one of a sidelink signal or a vehicle to everything (V2X) signal comprising a subset of the set of distal data.

6. The apparatus of claim 1, further comprising a transceiver coupled to the at least one processor, wherein, to receive, from the set of wireless devices, the set of distal data comprising the set of environmental inputs associated with the UE, the at least one processor is configured to:

receive, via the transceiver, a wireless signal from at least one of a second UE, an on-board unit (OBU) of a vehicle or a road side unit (RSU).

7. The apparatus of claim 4, wherein the at least one processor is further configured to:

collect the set of sensor data from the set of sensors at the UE.

8. The apparatus of claim 7, wherein the set of sensors comprises at least one of:

an accelerometer;

a camera;

an inertial measurement unit (IMU); or an odometer.

9. The apparatus of claim 1, wherein the set of potential positioning actions comprises at least one of:

refraining from performing the positioning action until an event is detected by the UE;

switching to a low-power mode of the UE;

resetting the positioning device;

selecting a first subset of the set of positioning signal transmission devices for the calculation of the set of positioning attributes; or selecting a second subset of the set of positioning signal transmission devices for the calculation of the set of positioning attributes.

10. The apparatus of claim 1, wherein the positioning device comprises a global navigation satellite system (GNSS) device.

11. The apparatus of claim 1, wherein the set of positioning signal transmission devices comprises a set of global positioning satellites (GPSs).

12. A method of improving wireless positioning recovery at a user equipment (UE), comprising:

receiving a set of positioning signals from a set of positioning signal transmission devices;

calculating a set of positioning attributes of the UE using a positioning device based on the received set of positioning signals;

receiving, from a set of wireless devices located distal from the UE, a set of distal data comprising a set of environmental inputs associated with the UE;

calculating an initial state of the positioning device based on the calculated set of positioning attributes and the received set of distal data;

calculating an expected reward value for each of a set of potential positioning actions for the positioning device based on the calculated initial state; and performing a positioning action of the set of potential positioning actions on the positioning device based on the calculated expected reward value for each of the set of potential positioning actions.

13. The method of claim 12, further comprising:

receiving a second set of positioning signals from a second set of positioning signal transmission devices;

calculating a second set of positioning attributes of the UE using the positioning device based on the second set of positioning signals after the performance of the positioning action;

receiving, from at least one distal device of the set of wireless devices, a second set of distal data comprising a second set of environmental inputs associated with the UE;

calculating a resultant state of the positioning device based on the calculated second set of positioning attributes and the second set of distal data; and revising the expected reward value for the positioning action of the set of potential positioning actions for the positioning device based on the calculated resultant state of the UE.

14. The method of claim 12, wherein the set of environmental inputs comprises at least one of:

live traffic information associated with an estimated location of the UE;

path history of an on-board unit (OBU) device associated with at least one wireless device of the set of wireless devices; or map information associated with the estimated location of the UE.

15. The method of claim 12, further comprising:

determining a set of local data comprising a second set of environmental inputs associated with the UE, wherein the second set of environmental inputs comprises at least one of:

a central processing unit (CPU) usage metric associated with a CPU of the UE;

a wireless traffic metric usage metric associated with a transceiver of the UE;

a sensor calibration state metric associated with a sensor at the UE;

a set of sensor data associated with a set of sensors at the UE; or a power metric associated with a power consumption of the UE, wherein calculating the initial state of the positioning device based on the calculated set of positioning attributes and the received set of distal data comprises:

calculating the initial state of the positioning device further based on the determined second set of environmental inputs associated with the UE, wherein the set of local data is collected from data sources local to the UE.

16. The method of claim 12, wherein receiving, from the set of wireless devices, the set of distal data comprising the set of environmental inputs associated with the UE comprises:

receiving at least one of a sidelink signal or a vehicle to everything (V2X) signal comprising a subset of the set of distal data.

17. The method of claim 15, further comprising:

collecting the set of sensor data from the set of sensors at the UE.

18. The method of claim 12, wherein the set of potential positioning actions comprises at least one of:

refraining from performing the positioning action until an event is detected by the UE;

switching to a low-power mode of the UE;

resetting the positioning device;

selecting a first subset of the set of positioning signal transmission devices for the calculation of the set of positioning attributes; or selecting a second subset of the set of positioning signal transmission devices for the calculation of the set of positioning attributes.

19. The method of claim 12, wherein the positioning device comprises a global navigation satellite system (GNSS) device.

20. A non-transitory computer-readable medium storing computer executable code at a user equipment (UE), the code when executed by at least one processor causes the at least one processor to:

receive a set of positioning signals from a set of positioning signal transmission devices;

calculate a set of positioning attributes of the UE using a positioning device based on the received set of positioning signals;

receive, from a set of wireless devices located distal from the UE, a set of distal data comprising a set of environmental inputs associated with the UE;

calculate an initial state of the positioning device based on the calculated set of positioning attributes and the received set of distal data;

calculate an expected reward value for each of a set of potential positioning actions for the positioning device based on the calculated initial state; and perform a positioning action of the set of potential positioning actions on the positioning device based on the calculated expected reward value for each of the set of potential positioning actions.

* * * * *